United States Patent
He et al.

(10) Patent No.: US 11,768,664 B2
(45) Date of Patent: Sep. 26, 2023

(54) PROCESSING UNIT WITH MIXED PRECISION OPERATIONS

(71) Applicant: ADVANCED MICRO DEVICES, INC., Santa Clara, CA (US)

(72) Inventors: Bin He, Orlando, FL (US); Michael Mantor, Orlando, FL (US); Jiasheng Chen, Orlando, FL (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 16/591,031

(22) Filed: Oct. 2, 2019

(65) Prior Publication Data
US 2020/0293286 A1 Sep. 17, 2020

Related U.S. Application Data

(60) Provisional application No. 62/818,998, filed on Mar. 15, 2019.

(51) Int. Cl.
| | | |
|---|---|---|
| *G06F 7/57* | (2006.01) | |
| *G06F 7/544* | (2006.01) | |
| *G06F 9/38* | (2018.01) | |
| *G06F 7/483* | (2006.01) | |

(52) U.S. Cl.
CPC ............... *G06F 7/57* (2013.01); *G06F 7/483* (2013.01); *G06F 7/5443* (2013.01); *G06F 9/3818* (2013.01); *G06F 2207/3824* (2013.01)

(58) Field of Classification Search
CPC .......... G06F 7/57; G06F 7/483; G06F 7/5443; G06F 9/3818
See application file for complete search history.

(56) References Cited

U.S. PATENT DOCUMENTS

| | | | | |
|---|---|---|---|---|
| 5,742,840 A | * | 4/1998 | Hansen | H04N 21/238 712/210 |
| 6,311,263 B1 | * | 10/2001 | Barlow | G06F 15/7832 712/36 |
| 7,461,106 B2 | * | 12/2008 | Mittal | G06F 17/17 708/200 |
| 2009/0300336 A1 | | 12/2009 | Wang et al. | |
| 2011/0055308 A1 | * | 3/2011 | Mantor | G06F 7/5443 708/523 |

(Continued)

FOREIGN PATENT DOCUMENTS

EP 3396524 10/2018

OTHER PUBLICATIONS

International Search Report and Written Opinion dated Jul. 2, 2020 for International Application No. PCT/US2020/021853, 11 pages.

(Continued)

*Primary Examiner* — Michael D. Yaary

(57) ABSTRACT

A graphics processing unit (GPU) implements operations, with associated op codes, to perform mixed precision mathematical operations. The GPU includes an arithmetic logic unit (ALU) with different execution paths, wherein each execution path executes a different mixed precision operation. By implementing mixed precision operations at the ALU in response to designate op codes that delineate the operations, the GPU efficiently increases the precision of specified mathematical operations while reducing execution overhead.

20 Claims, 4 Drawing Sheets

(56) References Cited

U.S. PATENT DOCUMENTS

| | | |
|---|---|---|
| 2018/0032381 A1 | 2/2018 | Ki |
| 2018/0113678 A1 | 4/2018 | Sadowski et al. |
| 2018/0307495 A1 | 11/2018 | Ould-Ahmed-Vall |
| 2018/0315159 A1 | 11/2018 | Ould-Ahmed-Vall |
| 2018/0322607 A1* | 11/2018 | Mellempudi ........ G06N 3/0454 |

OTHER PUBLICATIONS

International Preliminary Report on Patentability dated Sep. 30, 2021 for International Application No. PCT/US2020/021853, 2 pages.
Office Action dated Apr. 12, 2023 for Indian Application No. 202117028731, 6 pages.
Extended European Search Report dated Nov. 3, 2022 for Application No. 20773171.2, 9 pages.

* cited by examiner

PROCESSING UNIT WITH MIXED PRECISION OPERATIONS

CROSS REFERENCE TO RELATED APPLICATIONS

This application claims priority to the U.S. Provisional Patent Application Ser. No. 62/818,998 filed on Mar. 15, 2019 and entitled "Efficient GPU Architecture," which is hereby incorporated by reference in its entirety.

BACKGROUND

A processor employs one or more processing units that are specially designed and configured to perform designated operations on behalf of the processor. For example, some processors employ graphics processing unit (GPU) or other parallel processing units typically implement multiple processing elements (which are also referred to as processor cores or compute units) that concurrently execute multiple instances of a single program on multiple data sets to perform graphics, vector and other compute processing operations. A central processing unit (CPU) of the processor provides commands to the GPU, and a command processor (CP) of the GPU decodes the commands into one or more operations. Execution units of the GPU, such as one or more arithmetic logic units (ALUs), execute the operations to perform the graphics and vector processing operations.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

FIGS. 1-4 illustrate techniques wherein a parallel processing unit, in this example a graphics processing unit (GPU), implements operations, with associated op codes, to perform mixed precision mathematical operations. The GPU includes an arithmetic logic unit (ALU) with different execution paths, wherein each execution path executes a different mixed precision operation. By implementing mixed precision operations at the ALU in response to designated op codes that delineate the operations, the GPU efficiently increases the precision of specified mathematical operations while reducing execution overhead.

To illustrate, in the course of executing instructions a GPU executes mathematical operations designated by op codes associated with the instructions. The op codes indicate the precision of the mathematical operation at least in part by designating the size of operands used for the mathematical operation. For example, some op codes designate 16-bit floating point operations, to be performed with 16-bit operands, while other op codes designate 32-bit operations, to be performed with 32-bit operands. Conventionally, all of the operands used by the operation are of the same size, and therefore of the same precision. However, for some operations, such as some vector processing mathematical operations, employing operands having a same size results in overall loss of precision for the operations. For example, the result of a dot product operation wherein all of the operands are limited to 16 bits has a relatively low precision for some applications. Using the techniques described herein, a GPU performs mathematical operations with mixed precision operands in response to corresponding op codes, thereby efficiently supporting increased mathematical precision.

Figure 1:
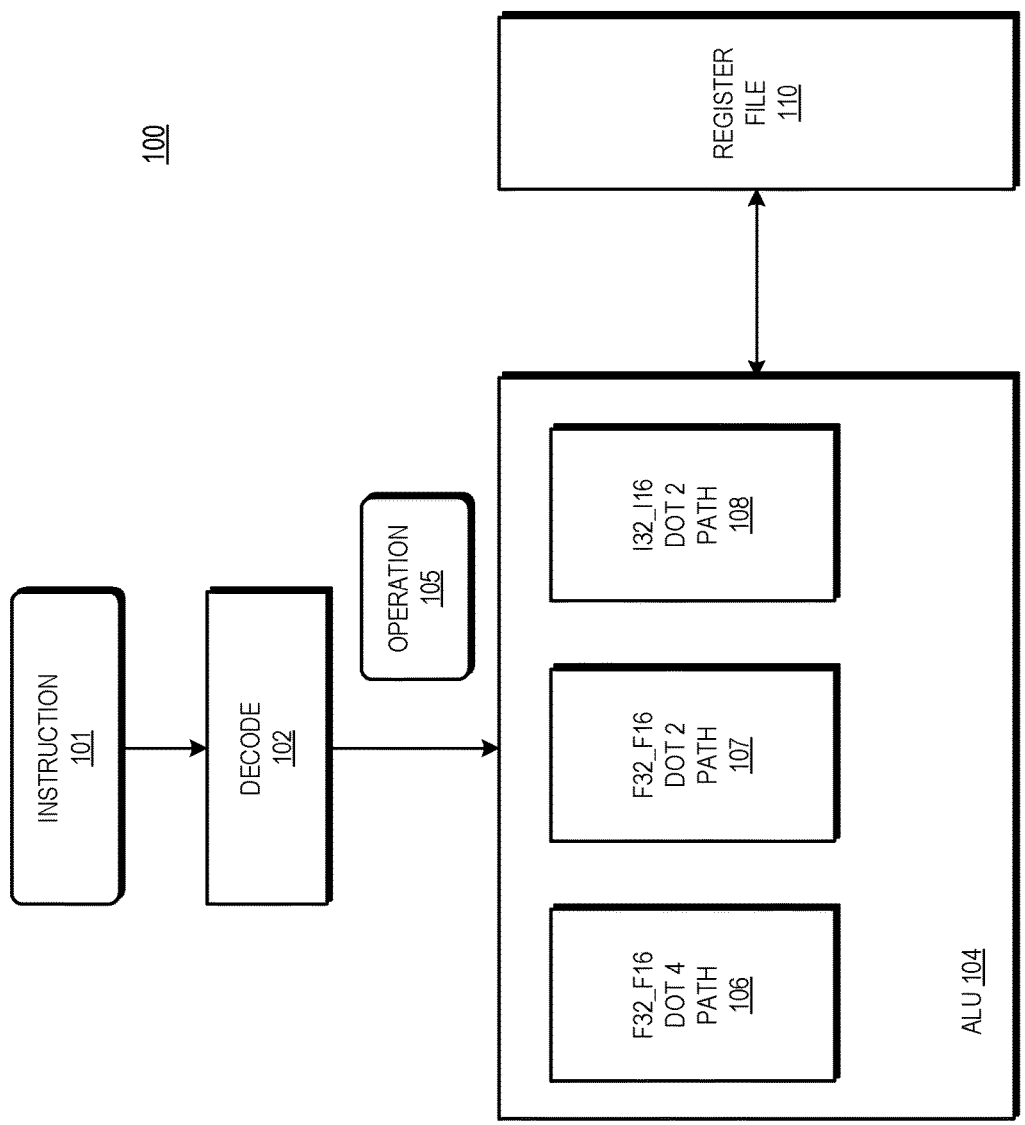
FIG. 1 is a block diagram of a portion of processing unit that employs op codes for mixed precision operations in accordance with some embodiments.

FIG. 1 illustrates a GPU 100 that supports mixed precision operations in accordance with some embodiments. For purposes of description, it is assumed that the GPU 100 is part of a processor that executes sets of instructions (e.g. computer programs) to carry out tasks on behalf of an electronic device. Thus, in different embodiments the GPU 100 is part of an electronic device such as a desktop computer, laptop computer, server, tablet, smartphone, game console, and the like. Further, it is assumed that the processor including the GPU 100 includes a central processing unit (CPU) that executes the sets of instructions.

The GPU 100 is designed and manufactured to carry out specified operations on behalf of the CPU. In particular, the GPU 100 performs graphics and vector processing operations on behalf of the CPU. For example, in some embodiments, in the course of executing instructions the CPU generates commands associated with graphics and vector processing operations. The CPU provides the commands to the GPU 100, which employs a command processor (not shown) to decode the commands into sets of instructions for execution at the GPU 100.

To facilitate execution of instructions, the GPU 100 includes a decode stage 102 and an ALU 104. In some embodiments, the decode stage 102 is part of an instruction pipeline (not shown) including additional stages to support instruction execution, including a fetch stage to fetch instructions from an instruction buffer, additional decode stages, execution units in addition to the ALU 104, and a retire stage to retire executed instructions. The decode stage 102 includes circuitry to decode instructions (e.g., instruction 101) received from the fetch stage into one or more operations (e.g., operation 105) and dispatches the operations to one of the execution units, according to the type of operation. In some embodiments, each operation is identified by a corresponding op code, and the decode stage identifies the execution unit based on the op code and provides information to the execution unit indicating the op code. The execution unit employs the op code, or information based thereon, to determine the type of operation to be executed, and executes the indicated operation.

For example, some operations, and associated op codes, indicate arithmetic operations. In response to identifying that a received instruction indicates an arithmetic operation, the decode stage 102 determines the op code for the operation and provides the op code to the ALU 104, along with other information such as the operands to be used for the arithmetic operation. The ALU 104 executes the operation indicated by the op code using the indicated operands stored at a register file 110. In some embodiments, the operation provided by the ALU 104 indicates the precision of the operands and the operation to be executed. For example, in some embodiments the decode stage 102 provides one operation (and corresponding op code) for a 16-bit multiplication operation using 16-bit operands and provides another operation (and corresponding op code) for a 32-bit multiplication operation using 32-bit operands.

In addition, the decode stage 102 generates operations, with corresponding op codes, for mixed precision mathematical operations, wherein the mixed precision operations employ operands of different sizes. For example, in some embodiments, the decode stage generates, based on corresponding instructions, multiply-accumulate (MACC) operations that multiply operands of one size (e.g. 16 bits) and accumulate the results with an operand of a different size (e.g. 32 bits). In some embodiments these operations include: 1) a mixed precision dot product operation (designated DOT4_F32_F16) that multiplies two sets of four 16-bit floating point operands and adds the multiplication results to each other and to a 32-bit floating point operand; 2) a mixed precision dot product operation (designated DOT2_F32_F16) that multiplies two sets of two 16-bit floating point operands and adds the multiplication results to each other and to a 32-bit floating point operand; and 3) a mixed precision dot product operation (designated DOT_I32_I16) that multiplies two sets of four 16-bit integer operands and adds the multiplication results to each other and to a 32-bit integer operand.

The ALU 104 includes different execution paths to execute each mixed precision operation. In some embodiments, different execution paths share electronic components or modules, such as registers, adders, multipliers and the like. In other embodiments some or all of the different execution paths are independent and do not share arithmetic circuitry or modules. In the depicted embodiment the ALU 104 includes a path 106 to execute the DOT4_F32_F16 operation, a path 107 to execute the DOT2_F32_F16 operation, and a path 108 to execute the DOT4_I32_I16 operation. In response to receiving the op code or other indicator for a mixed precision operation, the ALU 104 executes the operation using the corresponding execution path and stores the results at a register of the register file 110. In some embodiments, each mixed precision operation is designated by a single op code. That is, the ALU 104 does not require multiple op codes or operations to perform a mixed precision operation, reducing processing overhead while supporting improved precision.

Figure 2:
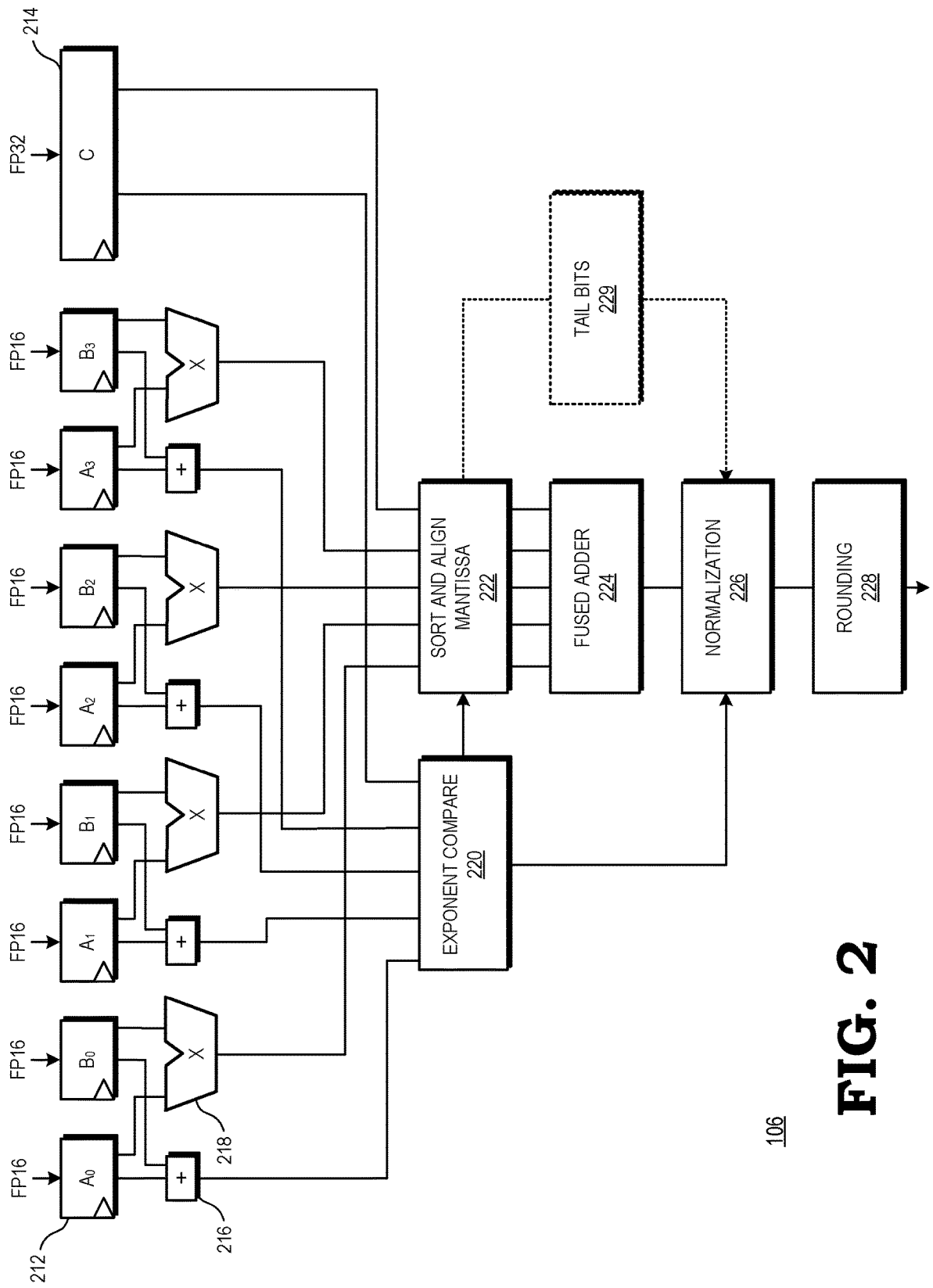
FIG. 2 is a block diagram of a mixed precision floating point execution path of the processing unit of FIG. 1 in accordance with some embodiments.

FIG. 2 illustrates the DOT4_F32_F16 execution path 106 in accordance with some embodiments. As noted above, the DOT4_F32_F16 operation multiplies one set of four 16-bit operands (designated for purposes of description as $A_0, A_1, A_2$, and $A_3$) with corresponding ones of another set of four 16-bit operands (designated for purposes of description as $B_0, B_1, B_2$, and $B_3$), and adds the results to a third 32-bit operand (designated C). Thus, the DOT4_F32_F16 operation is represented by the following formula:

$$D.f32 = A116[0]*B.f16[0] + A116[1]*B.f16[1] + A.f16[2]*B.f16[2] + A116[3]*B.f16[3] + C.f32$$

Further, the function of the DOT_F32_F16 operation is represented by the following pseudo-code:

```
struct FP90 {
    bit sign;
    bit8 exp;
    bit81 man;
};
FP32 dot4_f32_f16_fused(FP16 a[4], FP16 b[4], FP32 c) {
    FP90 abMul[4];
    for (int i = 0; i < 4; i++) {
        abMul[i] = a[i] * b[i]; //Convert to FP90
    }
    //do sequence adder
    FP90 sum = 0;
    for (int i = 0; i < 4; i++) {
        sum += abMul[i];
    }
    sum += c;
    FP32 result = cvt2f32(sum);
    return result;
}
```

To implement the operation, the execution path 106 includes a set of 16-bit registers (e.g. register 212) to store the operands $A_0, A_1, A_2$, and $A_3$ and the operands $B_0, B_1, B_2$, and $B_3$, and a 32-bit register to store the operand C. Each of these operands is represented as a floating point number including a mantissa and exponent. The execution path 106 further includes a set of adders (e.g. adder 216) and multipliers (e.g. multiplier 218), wherein each adder adds the exponents of a corresponding pair of A and B operands, and each multiplier multiplies the mantissa of a corresponding pair of A and B operands. Thus, for example, the adder 216 adds the exponents of the operands $A_0$ and $B_0$, and the multiplier 218 multiplies the mantissas of the operands $A_0$ and $B_0$.

The execution path 106 further includes an exponent compare module 220 and a mantissa sort and align module 222. The exponent compare module 220 receives the summed exponents from the adders and compares the sums to determine any mismatches in the exponents and determines a provisional exponent value for the result D.f32 for subsequent normalization, described below. The exponent compare module 220 provides control signaling to the mantissa sort and align module 222 that indicates the identified mismatches. The mantissa sort and align module 222 receives the mantissa products from the multipliers and, based on the information provided by the exponent compare module. Based on the exponent mismatch information, the mantissa sort and align module 222 shifts the mantissa products so that each mantissa product, after shifting is represented by the same exponent value. The mantissa sort and align module 222 thereby aligns the mantissa products for adding.

To add the aligned mantissa products, the execution path 106 includes a fused adder 224. In some embodiments, to increase precision the fused adder 224 adds values having larger bit sizes than the A, B, and C operands. For example, in some embodiments the A and B operands are 16-bit value, the C operand is a 32-bit value, and the mantissa sort and align module 222 generates mantissa values that are 82 bits wide. In these embodiments, the fused adder 224 is able to add values of 82 bits (or greater), thereby preventing loss of precision during the mantissa addition.

The fused adder 224 adds the mantissa values to generate a provisional value for the mantissa of D.f32 and provides the provisional mantissa value to a normalization module 226, which normalizes the provisional mantissa value. For example, in some embodiments the normalization module 226 shifts the provisional mantissa value to remove any leading zeroes in the mantissa. In some embodiments, the normalization module 226 adjusts the provisional mantissa to force the integer portion of the provisional mantissa to be a specified value (e.g. 1). Based on the adjustments made to the mantissa, the normalization module adjusts the provisional exponent value provided by the exponent compare module 220 to preserve the overall value of the provisional mantissa. In addition, the normalization module sets a sticky bit for the mantissa based on the tail bits 229 received from the mantissa sort and align module 222.

The normalization module 226 provides the adjusted mantissa and exponent values for D.f32 to a rounding module 228. The rounding module 228 rounds the mantissa value based on specified rounding rules, such as rounding D.f32 to the nearest even value, thereby generating the final value for D.f32. The rounding module 228 provides the final D.f32 value to the register file 110 for storage, at a register indicated by the received operation.

Figure 3:
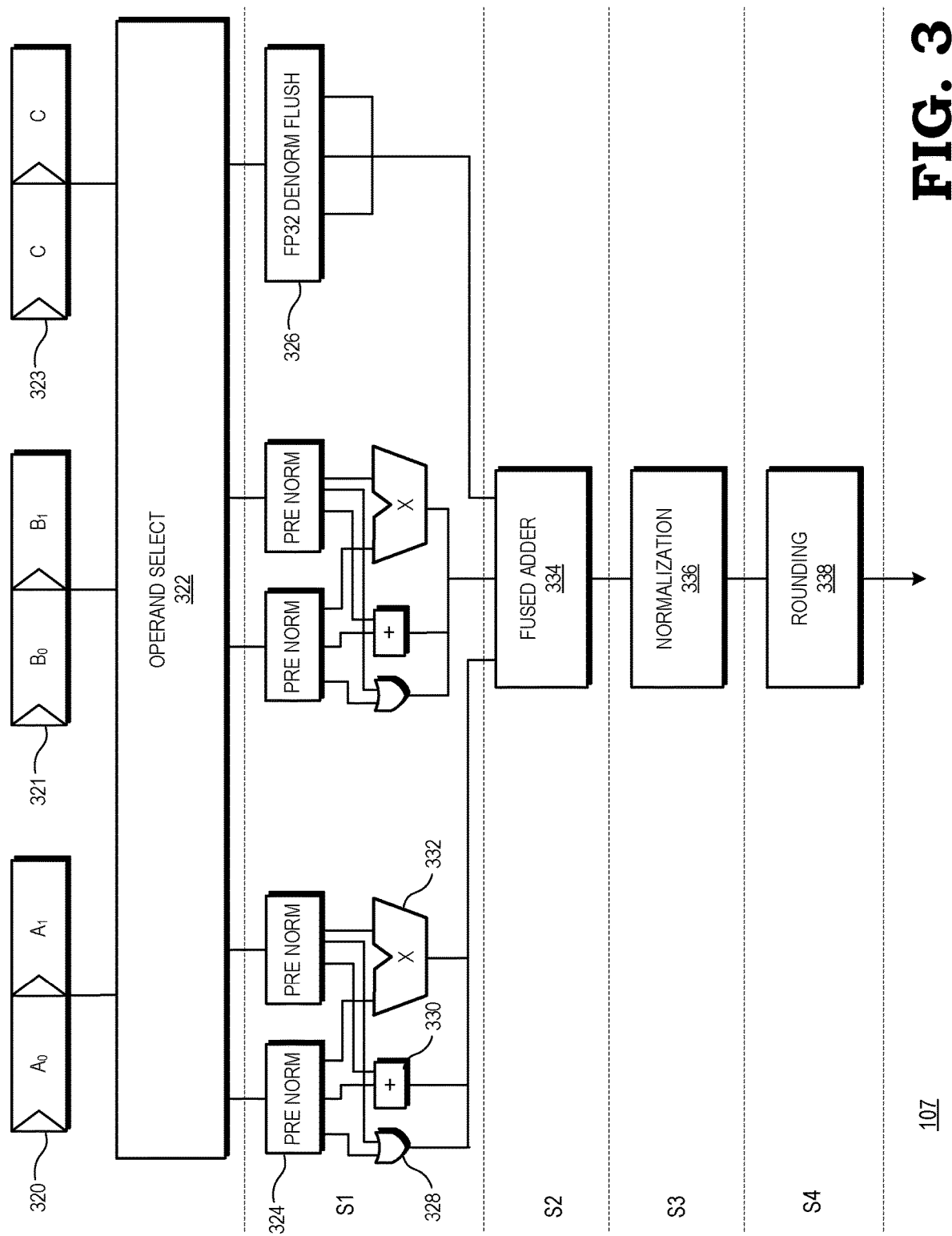
FIG. 3 is a block diagram of another mixed precision floating point execution path of the processing unit of FIG. 1 in accordance with some embodiments.

FIG. 3 illustrates the DOT2_F32_F16 execution path 107 in accordance with some embodiments. As noted above, the DOT2_F32_F16 operation multiplies one set of 2 16-bit operands (designated for purposes of description as $A_0$ and $A_1$) with corresponding ones of another set of two 16-bit operands (designated for purposes of description as $B_0$ and $B_1$), and adds the results to a third 32-bit operand (designated C). Thus, the DOT2_F32_F16 operation is be represented by the following formula:

$$D.f32 = A.f16[0]*B.f16[0] + A16[1]*B.f16[1] + C.f32$$

To implement the operation, the execution path 107 includes a set of 32-bit registers (registers 320, 321, and 323) to store the operands $A_0$, $A_1$, $B_0$, $B_1$, and the operand C. In some embodiments, the operands are stored at different ones of the registers 320, 321, and 323, depending upon the particular instruction or operation being executed. For example, for one instance of the DOT2_F32_F16 operation the register 320 stores the A operands, the register 321 stores the B operands, and the register 323 stores the C operand. For another instance of the DOT2_F32_F16 operation, the register 320 stores the C operand, the register 321 stores the B operands, and the register 323 stores the A operands. Further, for different instances of the DOT2_F32_F16 operation, different portions of the 32-bit registers store different ones of the 16-bit operands. For example, for some instances the $A_0$ operand is stored in the upper 16 bits of one of the registers 320, 321, and 323 and for other instances the $A_0$ operand is stored in the lower 16 bits of one of the registers 320, 321, and 323. The execution path 106 further includes an operand select module to select the operands from the registers 320, 321, and 323 based on control information provided by the received operation.

Each of the operands is represented as a floating point number including a mantissa and exponent. The execution path 107 includes a set of pre-normalization modules (e.g. pre-normalization module 324) to pre-normalize the 16-bit operands $A_0$, $A_1$, $B_0$, $B_1$ by, for example, converting the 16-bit operands to 32-bit operands, such as by converting the exponent value for the 16 bit operands. In addition, the execution path 107 includes a denormalization flush module 326 that flushes the value of C to zero when the C operand is a denormal value.

To multiply the A and B operands, the execution path 107 includes a set of AND gates (e.g. AND gate 328), a set of adders (e.g. adder 330) and a set of multipliers (e.g. multiplier 332). Each AND gate performs a logical AND operation on the sign bits for a corresponding pair of pre-normalized A and B operands to generate a sign bit for the corresponding multiplication operation. Thus, for example, in one instance the AND gate 328 performs an AND operation for the sign bits of the pre-normalized operands $A_0$ and $B_0$ to generate a sign bit for the $A_0*B_0$ operation. Each adder adds the exponents of a corresponding pair of pre-normalized A and B operands, and each multiplier multiplies the mantissa of a corresponding pair of pre-normalized A and B operands. Thus, for example, the adder 216 adds the exponents of the pre-normalized operands $A_0$ and $B_0$, and the multiplier 218 multiplies the mantissas of the pre-normalized operands $A_0$ and $B_0$.

To add the products generated by the AND gates, multipliers, and adders, the execution path 107 includes a fused adder 334. In some embodiments, to increase precision the fused adder 224 adds values having larger bit sizes than the A, B, and C operands. For example, in some embodiments the A and B operands are 16-bit values, the C operand is a 32-bit value, the adders generate a 7-bit exponent, and the multipliers generate 22-bit mantissa products. In these embodiments, the fused adder 334 is able to add values of 52 bits, thereby preventing loss of precision during the mantissa addition.

The fused adder 224 adds the mantissa products values to generate a provisional value for the mantissa of D.f32 and provides the provisional mantissa value and exponent values to a normalization module 336, which normalizes the provisional D.f32 value. For example, in some embodiments the normalization module 336 shifts the provisional mantissa value to remove any leading zeroes in the mantissa. In some embodiments, the normalization module 336 adjusts the provisional mantissa to force the integer portion of the provisional mantissa to be a specified value (e.g. 1). Based on the adjustments made to the mantissa, the normalization module adjusts the provisional exponent value to preserve the overall value of D.f32.

The normalization module 336 provides the adjusted mantissa and exponent values for D.f32 to a rounding module 338. The rounding module 338 rounds the mantissa value based on specified rounding rules, such as rounding D.f32 to the nearest even value, thereby generating the final value for D.f32. The rounding module 228 provides the final D.f32 value to the register file 110 for storage.

Figure 4:
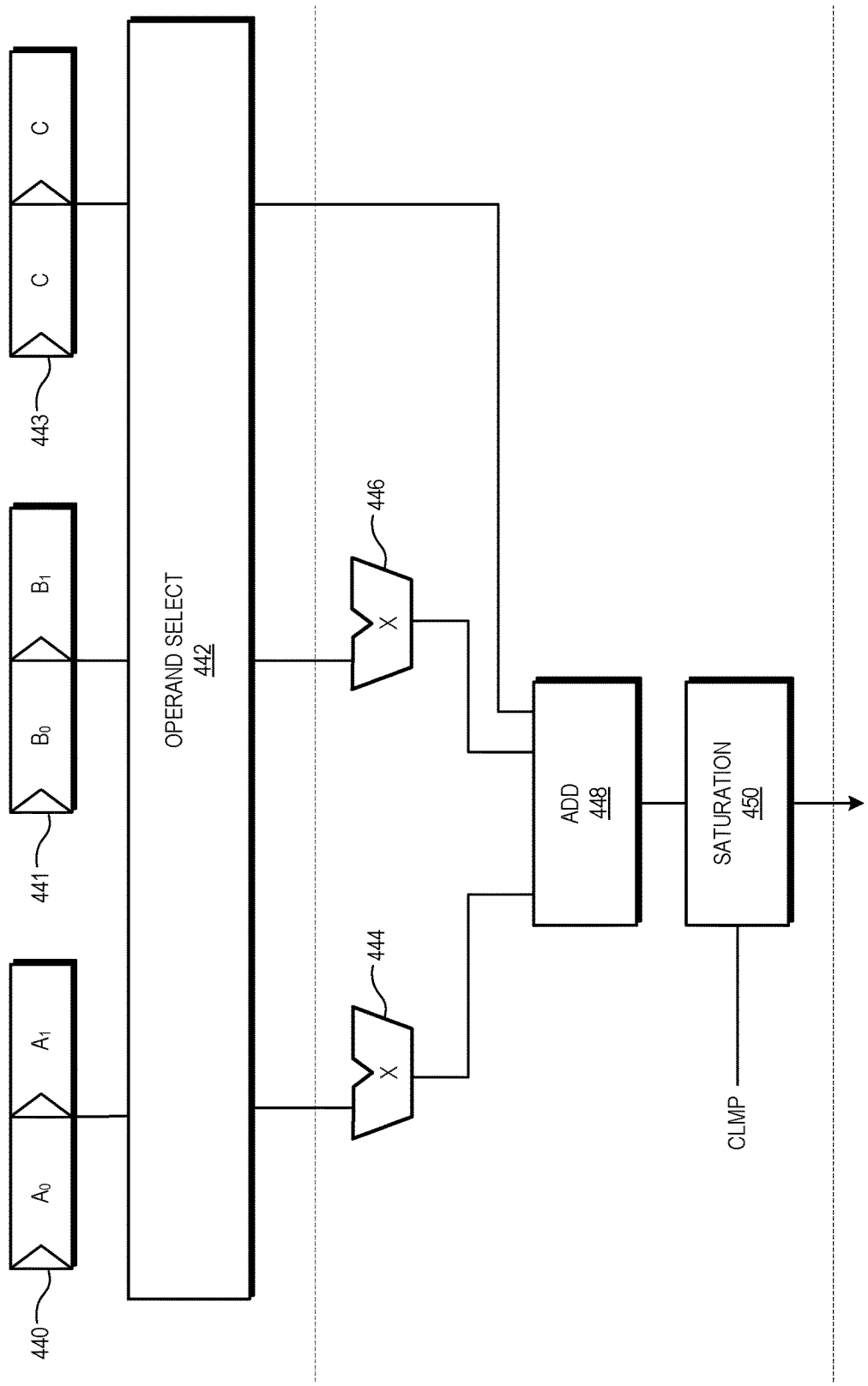
FIG. 4 is a block diagram of a mixed precision integer execution path of the processing unit of FIG. 1 in accordance with some embodiments.

FIG. 4 illustrates the DOT2_I32_I16 execution path 108 in accordance with some embodiments. As noted above, the DOT2_I32_I16 operation multiplies one set of 2 16-bit integer operands (designated for purposes of description as $A_0$ and $A_1$) with corresponding ones of another set of two 16-bit integer operands (designated for purposes of description as $B_0$ and $B_1$), and adds the results to a third 32-bit integer operand (designated C). Thus, the DOT2_I32_I16 operation is represented by the following formula:

$$D.i32 = A.i16[0]*B.i16[0] + A.i16[1]*B.i16[1] + C.i32$$

To implement the operation, the execution path 108 includes a set of 32-bit registers (registers 440, 441, and 443) to store the operands $A_0$, $A_1$, $B_0$, $B_1$, and the operand C. In some embodiments, the operands are stored at different ones of the registers 440, 441, and 443, depending upon the particular instruction or operation being executed, similar to the execution path 107 described above with respect to FIG. 3. The execution path 108 further includes an operand select module to select the operands from the registers 440, 441, and 443 based on control information provided by the received operation.

To multiply the A and B operands, the execution path 108 includes multipliers 444 and 446. Each of the multipliers 444 and 446 multiplies corresponding pairs of the 16-bit operands to generate a 32-bit product. The execution path 108 further includes a 32-bit adder that adds the products generated by the multipliers 444 and 446 with each other and with the C operand to generate a provisional value for D.i32. The execution path 108 includes a saturation module 450 that receives the provisional value for D.i32 as well as a clamp value (designated CLMP). The saturation module 450 compares the provisional D.i32 value with the CLMP value. In response to the D.i32 value exceeding the CLMP value, the saturation module 450 sets the final D.i32 value to the CLMP value and otherwise sets the final D.i32 value to the provisional D.i32 value. The saturation module 450 provides the final D.i32 value to the register file 110 for storage.

In some embodiments, certain aspects of the techniques described above may implemented by one or more processors of a processing system executing software. The software includes one or more sets of executable instructions stored or otherwise tangibly embodied on a non-transitory computer readable storage medium. The software includes the instructions and certain data that, when executed by the one or more processors, manipulate the one or more processors to perform one or more aspects of the techniques described above. The non-transitory computer readable storage medium includes, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
    decoding a first instruction at a processing unit to identify a first multi-precision operation designated by a single operation code;
    selecting, based on the single operation code, a first execution path from a plurality of execution paths available at an arithmetic logic unit (ALU), wherein each of the execution paths of the plurality of execution paths executes a different multi-precision operation; and
    executing the first multi-precision operation via the first execution path of the ALU by executing a first mathematical operation using operands of different precisions.

2. The method of claim 1, wherein the first mathematical operation comprises a floating point multiply-accumulate operation.

3. The method of claim 2, wherein the floating point multiply-accumulate operation multiplies two sets of N operands of a first precision and adds an operand of a second precision different than the first precision.

4. The method of claim 3, wherein N is at least two.

5. The method of claim 4, wherein N is at least four.

6. The method of claim 1, wherein the first mathematical operation comprises an integer multiply-accumulate operation.

7. The method of claim 1, further comprising:
    decoding a second instruction at the processing unit to identify a second multi-precision operation different from the first multi-precision operation; and
    executing the second multi-precision operation at the ALU by executing a second mathematical operation using operands of different precisions, the second mathematical operation different from the first mathematical operation.

8. The method of claim 7 wherein:
    executing the second multi-precision operation comprises executing the second multi-precision operation via a second execution path of the ALU, the second execution path different from the first execution path.

9. The method of claim 1, wherein the single operation code corresponds to a first execution path of the ALU, and the first multi-precision operation is executed at the ALU by executing the first mathematical operation using operands of different precisions via the first execution path of the ALU, of a plurality of different execution paths of the ALU, each of the different execution paths to execute respective different multi-precision operations designated by respective different single operation codes.

10. A processing unit, comprising:
    a decode stage to decode a first instruction to identify a first multi-precision operation designated by a single first operation code; and
    an arithmetic logic unit (ALU) to select, based on the single first operation code, a first execution path from a plurality of execution paths available at the ALU, and execute the first multi-precision operation via the first execution path by executing a first mathematical operation using operands of different precisions, wherein each of the execution paths of the plurality of execution paths executes a different multi-precision operation.

11. The processing unit of claim 10, wherein the first mathematical operation comprises a floating point multiply-accumulate operation.

12. The processing unit of claim 11, wherein the floating point multiply-accumulate operation multiplies two sets of N operands of a first precision and adds an operand of a second precision different than the first precision.

13. The processing unit of claim 10, wherein:
    the decode stage is to decode a second instruction to identify a second multi-precision operation different from the first multi-precision operation; and
    the ALU is to execute the second multi-precision operation at the ALU by executing a second mathematical operation using operands of different precisions, the second mathematical operation different from the first mathematical operation.

14. The processing unit of claim 13 wherein the ALU comprises:
a second execution path to execute the second multi-precision operation, the second execution path different from the first execution path.

15. The processing unit of claim 10, wherein the ALU is to execute the first multi-precision operation by executing the first mathematical operation using operands of different precisions via a first execution path of the ALU that corresponds to the single first operation code, of a plurality of different execution paths of the ALU, each of the different execution paths to execute respective different multi-precision operations designated by respective different single operation codes.

16. A processing unit, comprising:
an arithmetic logic unit (ALU) comprising:
a first execution path to execute a first multi-precision operation designated by a single first operation code by executing a first mathematical operation using operands of different precisions; and
a second execution path to execute a second multi-precision operation designated by a single second operation code by executing a second mathematical operation using operands of different precisions, the second execution path different from the first execution path.

17. The processing unit of claim 16, wherein the first mathematical operation comprises a first floating point multiply-accumulate operation and the second mathematical operation comprises a second floating point multiply-accumulate operation.

18. The processing unit of claim 17, wherein the first floating point multiply-accumulate operation multiplies two sets of N operands of a first precision and adds an operand of a second precision different than the first precision and wherein the second floating point multiply-accumulate operation multiplies two sets of M operands of the first precision and adds an operand of the second precision.

19. The processing unit of claim 18, wherein N is at least two and M is at least four.

20. The processing unit of claim 16, wherein the first execution path corresponds to the single first operation code, and the second execution path corresponds to the single second operation code.

* * * * *